United States Patent
Hu (10) Patent No.: US 10,334,464 B2
(45) Date of Patent: Jun. 25, 2019

(54) METHOD, APPARATUS, TERMINAL AND BASE STATION FOR DETECTING SPECTRUM RESOURCE

(71) Applicant: China Mobile Communications Corporation, Beijing (CN)

(72) Inventor: Nan Hu, Beijing (CN)

(73) Assignee: China Mobile Communications Corporation, Beijing (CN)

(*) Notice: Subject to any disclaimer, the term of this patent is extended or adjusted under 35 U.S.C. 154(b) by 110 days.

(21) Appl. No.: 15/581,551

(22) Filed: Apr. 28, 2017

(65) Prior Publication Data

US 2017/0230855 A1    Aug. 10, 2017

Related U.S. Application Data

(63) Continuation of application No. PCT/CN2015/093175, filed on Oct. 29, 2015.

(30) Foreign Application Priority Data

Oct. 31, 2014 (CN) .......................... 2014 1 0602406

(51) Int. Cl.
*H04W 24/08* (2009.01)
*H04W 16/14* (2009.01)
(Continued)

(52) U.S. Cl.
CPC ........... *H04W 24/08* (2013.01); *H04W 16/14* (2013.01); *H04W 24/10* (2013.01);
(Continued)

(58) Field of Classification Search
CPC ..... H04W 24/08; H04W 24/10; H04W 16/14; H04W 74/0816
See application file for complete search history.

(56) References Cited

U.S. PATENT DOCUMENTS 8,774,111 B2 * 7/2014 Sun ....................... H04W 24/10
370/322
2013/0322279 A1   12/2013 Chincholi et al.
(Continued)

FOREIGN PATENT DOCUMENTS

CN         102348211 A     2/2012
CN         102413476 A     4/2012
(Continued)

OTHER PUBLICATIONS

Written Opinion for International Application No. PCT/CN2015/093175, dated Feb. 2, 2016, 6 pages.
(Continued)

*Primary Examiner* — Jamal Javaid
(74) *Attorney, Agent, or Firm* — Mintz Levin Cohn Ferris Glovsky and Popeo, P.C.; Kongsik Kim; Jhongwoo Jay Peck (57) ABSTRACT

A method, apparatus, terminal and base station for detecting spectrum resource are provided by the present invention. The method comprises: receiving capability report command transmitted by a base station; transmitting capability report of a terminal to the base station according to the capability report command; receiving spectrum detection configuration command transmitted by the base station according to the capability report of the terminal; detecting spectrum and acquiring detection result according to the spectrum detection configuration command; transmitting detection result to the base station according to the detection task report command transmitted by the base station.

20 Claims, 5 Drawing Sheets

(51) Int. Cl.
*H04W 24/10* (2009.01)
*H04W 74/08* (2009.01)
*H04W 84/04* (2009.01)
*H04W 84/12* (2009.01)
*H04W 88/06* (2009.01)
*H04W 88/08* (2009.01)

(52) U.S. Cl.
CPC .... *H04W 74/0816* (2013.01); *H04W 74/0808* (2013.01); *H04W 84/042* (2013.01); *H04W 84/12* (2013.01); *H04W 88/06* (2013.01); *H04W 88/08* (2013.01)

(56) References Cited

U.S. PATENT DOCUMENTS

| | | |
|---|---|---|
| 2013/0336156 A1 | 12/2013 | Wei et al. |
| 2014/0044105 A1 | 2/2014 | Bontu et al. |
| 2014/0185653 A1 | 7/2014 | Bai et al. |
| 2015/0017999 A1* | 1/2015 | Chen .............. H04W 16/14 455/452.1 |
| 2016/0066322 A1 | 3/2016 | Bontu et al. |
| 2016/0157233 A1 | 6/2016 | Bai |
| 2017/0006493 A1 | 1/2017 | Chincholi et al. |

FOREIGN PATENT DOCUMENTS

| | | |
|---|---|---|
| CN | 103052095 A | 4/2013 |
| CN | 103546888 A | 1/2014 |
| CN | 15581551 A | 4/2017 |
| EP | 2696530 A2 | 2/2014 |
| WO | 2012116489 A1 | 9/2012 |

OTHER PUBLICATIONS

International Search Report for International Application No. PCT/CN2015/093175, dated Feb. 2, 2016, 2 pages.
Supplementary European Search Report in European application No. 15855848.6, dated Feb. 13, 2018.

* cited by examiner

METHOD, APPARATUS, TERMINAL AND BASE STATION FOR DETECTING SPECTRUM RESOURCE

CROSS REFERENCE OF RELATED APPLICATION

This application is a continuation application of International Application No. PCT/CN2015/093175 filed on Oct. 29, 2015, which claims priority to Chinese Patent Application No. 201410602406.7 filed on Oct. 31, 2014, which applications are incorporated herein by reference.

TECHNICAL FIELD

The disclosure relates to the technical field of communication, and more particularly to a method, apparatus, terminal, and base station for detecting spectrum resource.

BACKGROUND

Along with the increasing tension of spectrum resources, the communication industry puts forward an idea of applying a licence-free open frequency band, i.e., the Industrial, Scientific, and Medical (ISM) band for cellular mobile communication technology. The ISM frequency band bears various communication technologies due to its licence-free characteristic. Currently the Wireless Local Area Network (WLAN) technology is a most mainstream communication technology existing in the ISM frequency band throughout the world. The problem about how to implement ISM resource sharing between a future cellular mobile communication technology and WLAN without mutual interference is to be solved.

However, at present, a method for sharing a spectrum resource by two wireless communication technologies mainly relies on the Cognitive Radio technology. For example, a typical solution for spectrum resource sharing of Long-Term Evolution (LTE) and WLAN is that:

1: if an LTE system is intended to use a spectrum resource of a frequency band F, detection on the F frequency band is started at first, and reception of a signal of the frequency band F is completed through a base station;

2: if no interference is found in the frequency band F, the frequency band F may be utilized by the LTE system for LTE transmission, and if interference is found in the frequency band F, the LTE system gives up; and 3: if a WLAN system is intended to use the spectrum resource of the frequency band F, an operating manner is similar to that of the above.

It can thus be seen that, solutions in a related technology require a base station to have a capability of detecting a target shared frequency band, and when a base station of a cellular network and a WLAN are inconsistent in coverage, a conventional art may cause inaccurate detection and a detection loss. For example, an LTE base station finds by detection that no WLAN occupies resources of a certain frequency band, but actually, some WLANs of a part of regions within coverage of the base station are occupying the spectrum resources of this band. Actually, the WLANs do not cover the location where the LTE base station is, so that a detection loss appears.

Therefore, it is necessary to provide a method, apparatus, terminal, and base station for detecting spectrum resource, which may avoid a detection loss for spectrum resource.

SUMMARY

The disclosure provides a method and device for detecting spectrum resource, a terminal and a base station, which avoid a detection loss for spectrum resource.

The technical solutions adopted by the disclosure are implemented as follows.

According to one aspect of the disclosure, a method for detecting spectrum resource is provided, which may include that:

a capability reporting instruction sent by a base station is received;

a capability report of a terminal is sent to the base station according to the capability reporting instruction;

a spectrum sensing configuration command sent by the base station according to the capability report of the terminal is received;

spectrum sensing is performed to obtain a sensing result according to the spectrum sensing configuration command; and the sensing result is sent to the base station according to a sensing task reporting command transmitted by the base station.

The capability report may include: information about whether the terminal has a capability of communication in a preset frequency band or not, or whether the terminal has a spectrum sensing capability or not.

The spectrum sensing configuration command may include: a time length required by execution of a spectrum sensing task, a frequency point and bandwidth required by execution of the spectrum sensing task, and a period of execution of the spectrum sensing task.

The spectrum sensing configuration command may further include: one or more items among the followings: a time when the sensing task is started, a sensing result required to be recorded when any sensing task is executed, identification of the terminal which performs spectrum sensing and whether location information is required to be reported or not.

The step that spectrum sensing is performed to obtain the sensing result according to the spectrum sensing configuration command may include that:

a wireless communication module of the terminal is started, and a Carrier Sense Multiple Access with Collision Avoidance (CSMA/CA) function is enabled;

a channel sensing function in CSMA/CA is executed according to the spectrum sensing configuration command; and after the channel sensing function is completed, a sensing result is obtained.

The sensing result may include: whether a sensed channel is idle or not, transmitted energy on the sensed channel, and a geographical location during sensing.

Before the step that the sensing result is sent to the base station according to the sensing task reporting command transmitted by the base station, the method may further include that:

after spectrum sensing is completed, when in a connected state, a sensing completion indication is directly sent to the base station, and the sensing task reporting command transmitted by the base station is received.

Before the step that the sensing result is sent to the base station according to the sensing task reporting command transmitted by the base station, the method may further include that:

after spectrum sensing is completed, when in an idle state, the sensing completion indication is sent to the base station when entering the connected state next time, or random access is directly initiated, and after entering the connected state, the sensing completion instruction is sent to the base station, and the sensing task reporting command transmitted by the base station is received.

The sensing task reporting command may include: a time period when the spectrum sensing task is recorded, and a condition for reporting the spectrum sensing task by the terminal.

According to another aspect of the disclosure, a method for detecting spectrum resource is provided, which may include that:

capability reporting instructions are sent to terminals;

capability reports sent by the terminals are received according to the capability reporting instructions;

spectrum sensing configuration commands are sent to terminals with a spectrum sensing capability ahead of preset time according to the capability reports;

sensing task reporting commands are sent to the terminals with the spectrum sensing capability;

sensing results sent by the terminals with the spectrum sensing capability according to the sensing task reporting commands are received; and whether sensed spectrum resource is available or not is judged according to the sensing results sent by multiple terminals with the spectrum sensing capability.

The capability reports may include: information about whether the terminals have a capability of communication in preset frequency bands or not, or whether the terminals have the spectrum sensing capability or not.

When the terminals are in a connected state, the step that the spectrum sensing configuration commands are sent to the terminals with the spectrum sensing capability ahead of the preset time according to the capability reports may include that:

the spectrum sensing configuration commands are sent to the terminals ahead of the preset time through Radio Resource Control (RRC) signalling according to the capability reports.

The spectrum sensing configuration commands may include: time lengths required by execution of spectrum sensing tasks by the terminals, frequency points and bandwidths required by execution of the spectrum sensing tasks by the terminals, and periods of execution of the spectrum sensing tasks by the terminals.

The spectrum sensing configuration commands may further include: one or more items among the followings: times when the terminals start performing the sensing tasks, sensing results required to be recorded when any sensing task is executed by the terminals and whether the terminals are required to report location information or not.

When the terminals are in an idle state, the step that the spectrum sensing configuration commands are sent to the terminals with the spectrum sensing capability ahead of the preset time according to the capability reports may include that:

the spectrum sensing configuration commands are sent to the terminals ahead of the preset time in a paging manner according to the capability reports.

The spectrum sensing configuration commands may include: identification of the terminals which perform spectrum sensing, the time lengths required by execution of the spectrum sensing tasks by the terminals, the frequency points and bandwidths required by execution of the spectrum sensing tasks by the terminals, and the periods of execution of the spectrum sensing tasks by the terminals.

The spectrum sensing configuration commands may further include: one or more items among the followings: the times when the terminals start performing the sensing tasks, the sensing results required to be recorded when any sensing task is executed by the terminals and whether the terminals are required to report the location information or not.

The sensing results may include: whether sensed channels are idle or not, transmitted energy on the sensed channels and geographical locations of the terminals during sensing.

Before the step that the sensing task reporting commands are sent to the terminals, the method may further include that:

after the terminals complete the spectrum sensing tasks, sensing completion indications sent by the terminals are received.

The sensing task reporting commands may include: time periods when the spectrum sensing tasks are recorded, and conditions for reporting the spectrum sensing tasks by the terminals.

According to another aspect of the disclosure, a device for detecting spectrum resource is further provided, which may be applied to a terminal and include:

a first receiving module, configured to receive a capability reporting instruction sent by a base station;

a capability reporting module, configured to send a capability report of the terminal to the base station according to the capability reporting instruction;

a second receiving module, configured to receive a spectrum sensing configuration command sent by the base station according to the capability report of the terminal;

a spectrum sensing module, configured to perform spectrum sensing to obtain a sensing result according to the spectrum sensing configuration command; and a first sending module, configured to send the sensing result to the base station according to a sensing task reporting command transmitted by the base station.

According to another aspect of the disclosure, a device for detecting spectrum resource is further provided, which may be applied to a base station and include:

a first sending module, configured to send capability reporting instructions to terminals;

a first receiving module, configured to receive capability reports sent by the terminals according to the capability reporting instructions;

a second sending module, configured to send spectrum sensing configuration commands to terminals with a spectrum sensing capability ahead of preset time according to the capability reports;

a third sending module, configured to send sensing task reporting commands to the terminals with the spectrum sensing capability;

a second receiving module, configured to receive sensing results sent by the terminals with the spectrum sensing capability according to the sensing task reporting commands; and a processing module, configured to judge whether sensed spectrum resources or not according to the sensing results sent by multiple terminals with the spectrum sensing capability.

According to another aspect of the disclosure, a terminal is further provided, which may include the device applied to the terminal for detecting the spectrum resource.

According to another aspect of the disclosure, a base station is further provided, which may include the device applied to the base station for detecting the spectrum resource.

Embodiments of the disclosure disclose the method for detecting the spectrum resource, the capability reporting instruction sent by the base station is received at first, and then the capability report of the terminal is sent to the base station according to the capability reporting instruction, so that the base station may exactly know whether the terminal has the spectrum sensing capability or not; next, the terminal with the spectrum sensing capability may receive the spectrum sensing configuration command sent by the base station according to the capability report of the terminal; later on, the terminal may perform spectrum sensing to obtain the sensing result according to the spectrum sensing configuration command; and finally, after the base station transmits the sensing task reporting command, the terminal may send the sensing result to the base station according to the sensing task reporting command.

According to the solutions of the disclosure, a new function is introduced to the terminal, that is, spectrum sensing is performed according to the spectrum sensing configuration command sent by the base station, so that the base station may still judge whether the sensed spectrum resource is available or not according to the sensing results sent by multiple terminals even though not having a cognitive ratio related detection capability, appearance of detection loss for spectrum is avoided, and ISM frequency band sharing between a future cellular mobile communication technology and WLAN may further be implemented without mutual interference.

DETAILED DESCRIPTION

Exemplary embodiments of the disclosure will be described below with reference to the drawings in more detail. Although the exemplary embodiments of the disclosure are shown in the drawings, it should be understood that the disclosure may be implemented in various forms without limits of the embodiments elaborated herein. Instead, these embodiments are provided to make the disclosure understood more thoroughly and completely convey the scope of the disclosure to those skilled in the art.

Embodiment 1

According to one aspect of the disclosure, a method for detecting spectrum resource is provided. At first, a capability reporting instruction sent by a base station is received; then, a capability report of the terminal is sent to the base station according to the capability reporting instruction, so that the base station may exactly know whether the terminal has a spectrum sensing capability or not; next, the terminal with the spectrum sensing capability may receive a spectrum sensing configuration command sent by the base station according to the capability report of the terminal; later on, the terminal with the spectrum sensing capability may perform spectrum sensing to obtain a sensing result according to the spectrum sensing configuration command; and finally, after the base station transmits a sensing task reporting command, the terminal with the spectrum sensing capability may send the sensing result to the base station according to the sensing task reporting command.

Figure 1:
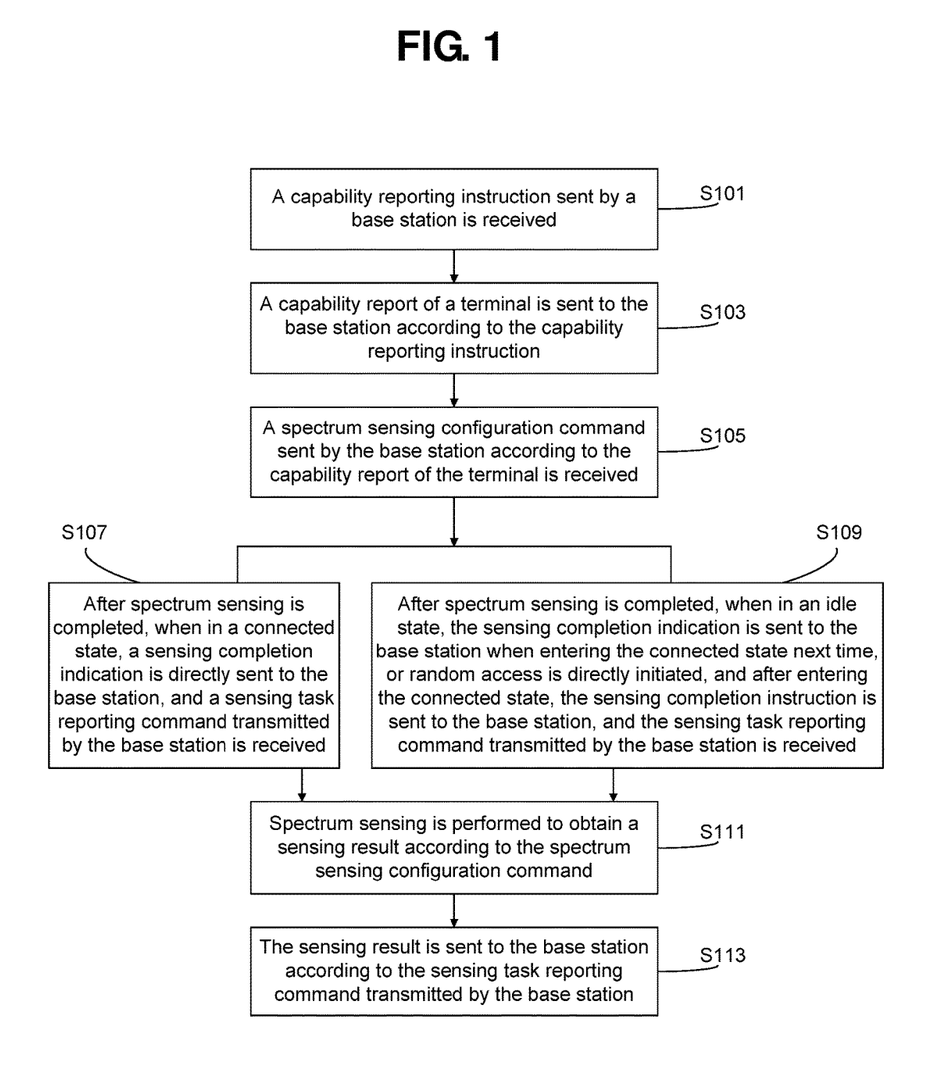
FIG. 1 is a flowchart of a method for detecting spectrum resource on a terminal side according to an embodiment of the disclosure.

As shown in FIG. 1, the method includes the following steps.

Step S101: a capability reporting instruction sent by a base station is received. When a certain spectrum resource is sensed, the base station may send a capability reporting instruction to multiple terminals at first, and the capability reporting instruction may be received by the corresponding terminal.

Step S103: a capability report of a terminal is sent to the base station according to the capability reporting instruction. The capability report includes: information about whether the terminal has a capability of communication in a preset frequency band or not, or whether the terminal has a spectrum sensing capability or not. The spectrum sensing capability refers to that the terminal may sense whether a certain frequency band may be configured for communication or not, that is, the frequency band is not occupied by another communication system. That is, in the capability report, the terminal may notify the base station of whether the terminal has a capability of sensing whether a certain frequency band may be configured for communication or not in an implicit manner that whether the terminal has the capability of communication in the preset frequency band or not or in an explicit manner that whether the terminal has the spectrum sensing capability or not.

Step S105: a spectrum sensing configuration command sent by the base station according to the capability report of the terminal is received.

The spectrum sensing configuration command must include the following items: a time length required by execution of a spectrum sensing task, a frequency point and bandwidth required by execution of the spectrum sensing task, and a period (for example, sensing is executed once every 3 s) of execution of the spectrum sensing task, so that the terminal may perform spectrum sensing of a corresponding period in a corresponding time period at a corresponding frequency band bandwidth of a certain spectrum.

Alternatively, according to a practical specific sensing requirement, the spectrum sensing configuration command may further include: one or more items among the followings: a time when the sensing task is started, a sensing result required to be recorded when any sensing task is executed and whether location information is required to be reported or not, so as to meet the practical sensing requirement.

In addition, when the terminal is in an idle state, the spectrum sensing configuration command sent to the terminal by the base station is further required to include information about identification of the terminal which performs spectrum sensing, so that the base station may successfully perform spectrum sensing configuration on the terminal in a paging manner.

Step S111: spectrum sensing is performed to obtain a sensing result according to the spectrum sensing configuration command.

Alternatively, the step that spectrum sensing is performed to obtain the sensing result according to the spectrum sensing configuration command includes that:

a wireless communication module of the terminal is started, and a CSMA/CA function is enabled;

a channel sensing function in CSMA/CA is executed according to the spectrum sensing configuration command; and after the channel sensing function is completed, a sensing result is obtained.

In the method for detecting the spectrum resource according to the embodiment of the disclosure, the adopted terminal is required to have the WLAN module, otherwise may not perform spectrum sensing. The sensing result may include: whether a sensed channel is idle or not, transmitted energy on the sensed channel, and a geographical location during sensing. Of course, it can be understood that a specific content of the sensing result in the method for detecting the spectrum resource according to the embodiment of the disclosure is not limited, and the sensing result is determined according to a specific content of the spectrum sensing configuration command.

Alternatively, before Step S111, the method further includes:

Step S107: after spectrum sensing is completed, when in a connected state, a sensing completion indication is directly sent to the base station, and a sensing task reporting command transmitted by the base station is received;

or Step S109: after spectrum sensing is completed, when in an idle state, the sensing completion indication is sent to the base station when entering the connected state next time, or random access is directly initiated, and after entering the connected state, the sensing completion instruction is sent to the base station, and the sensing task reporting command transmitted by the base station is received.

In the method for detecting the spectrum resource according to the embodiment of the disclosure, after completing the spectrum sensing task, the terminal may firstly send the sensing completion indication to the base station to notify the base station that the spectrum sensing task has been completed, so that the base station may conveniently control the terminal for a next operation. When the terminal is in the connected state, the terminal may directly send the sensing completion indication to the base station; and when in the idle state, the terminal may send the sensing completion indication to the base station when entering the connected state next time, and may also directly initiate random access, and after entering the connected state, sends the sensing completion indication to the base station and receives the sensing task reporting command transmitted by the base station.

Step S113: the sensing result is sent to the base station according to the sensing task reporting command transmitted by the base station, and the sensing task reporting command includes: a time period when the spectrum sensing task is recorded, and a condition for reporting the spectrum sensing task by the terminal. Specifically, for example, reporting is performed only when it is sensed that the channel is occupied. The terminal may send the sensing result consistent with the condition to the base station according to the received sensing task reporting command.

Embodiment 2

According to another aspect of the disclosure, a method for detecting spectrum resource is further provided. At first, a base station may send capability reporting instructions to terminals; then, capability reports sent by the terminals are received according to the capability reporting instructions; next, spectrum sensing configuration commands are sent to terminals with a spectrum sensing capability ahead of a preset time according to the capability reports; later on, sensing task reporting commands are sent to the terminals with the spectrum sensing capability; then, sensing results sent by the terminals with the spectrum sensing capability according to the sensing task reporting commands are received; and finally, whether sensed spectrum resources are available or not is judged according to the sensing results sent by multiple terminals with the spectrum sensing capability.

Figure 2:
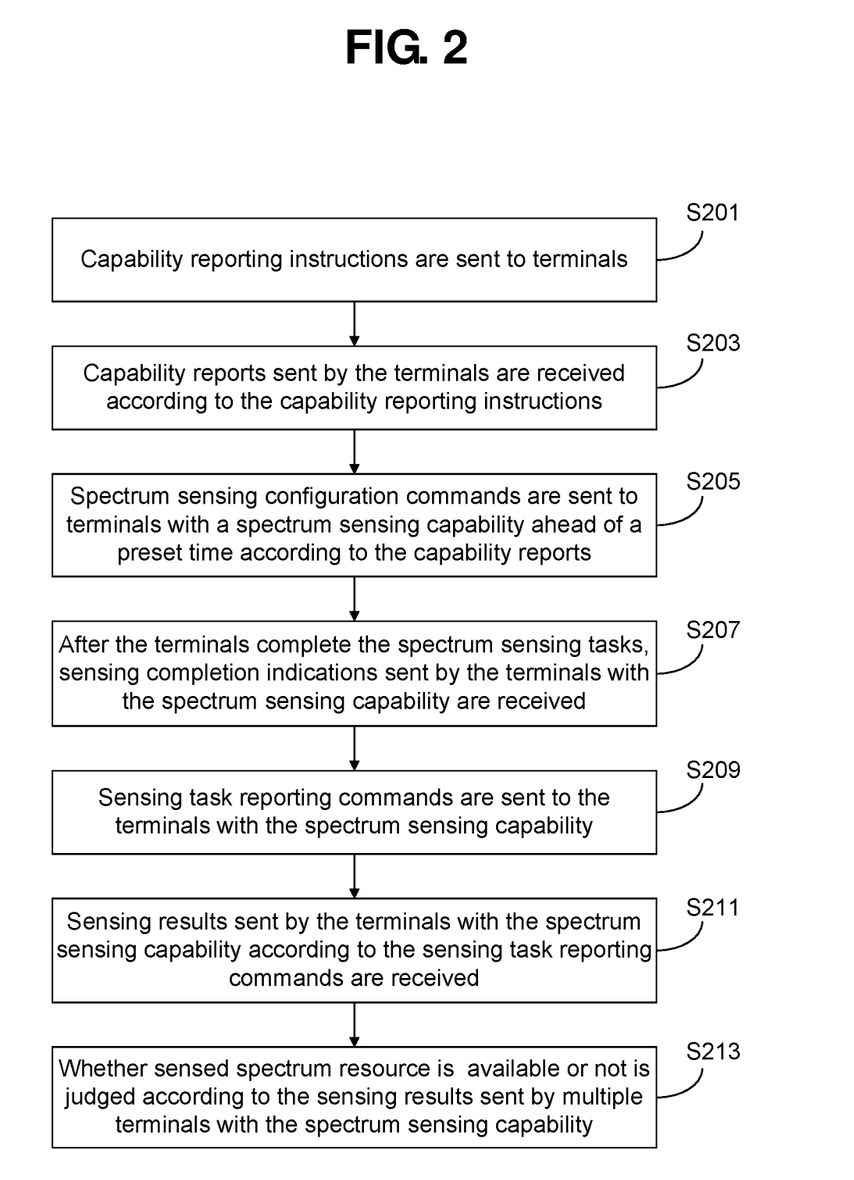
FIG. 2 is a flowchart of a method for detecting spectrum resource on a base station side according to an embodiment of the disclosure.

As shown in FIG. 2, the method for detecting the spectrum resource according to the embodiment of the disclosure includes the following steps.

Step S201: capability reporting instructions are sent to terminals. The terminals are required to report their own executable functions to the base station, and then the base station may select a terminal for spectrum sensing configuration, and the base station may be an Evolved Node B (eNB) of an LTE system or a NodeB of a 3rd-generation wireless communication system of Time Division Synchronous Code Division Multiple Access (TD-SCDMA) system.

Step S203: capability reports sent by the terminals are received according to the capability reporting instructions.

The capability reports include: information about whether the terminals have a capability of communication in preset frequency bands or not, or whether the terminals have the spectrum sensing capability or not.

Step S205: spectrum sensing configuration commands are sent to terminals with a spectrum sensing capability ahead of a preset time according to the capability reports, and the preset time are determined according to own capabilities of the terminals.

When the terminals with the spectrum sensing capability are in a connected state, the base station send the spectrum sensing configuration commands to the terminals through RRC signalling, and at this moment, the spectrum sensing configuration command must include the following items: time lengths required by execution of spectrum sensing tasks by the terminals, frequency points and bandwidths required by execution of the spectrum sensing tasks by the terminals, and periods of execution of the spectrum sensing tasks by the terminals.

When the terminals with the spectrum sensing capability are in an idle state, the base station send the spectrum sensing configuration commands to the terminals in a paging manner, and at this moment, the spectrum sensing configuration command must include the following items: identification of the terminals which perform spectrum sensing, the time lengths required by execution of the spectrum sensing tasks by the terminals, the frequency points and bandwidths required by execution of the spectrum sensing tasks by the terminals, and the periods of execution of the spectrum sensing tasks by the terminals, and the terminals are usually identified according to Identities (IDs) of the terminals.

Of course, it can be understood that: no matter whether the terminals are in the connected state or the idle state, the spectrum sensing configuration commands may include other items according to a requirement of a practical condition, for example: one or more items among: times when the terminals start performing the sensing tasks, sensing results required to be recorded when any sensing task is executed by the terminals and whether the terminals are required to report location information or not.

Step S209: sensing task reporting commands are sent to the terminals. The base station may trigger the terminals to report sensing results only after sending the sensing task reporting commands to the terminals.

Alternatively, before Step S209, the method may further include:

Step S207: after the terminals complete the spectrum sensing tasks, sensing completion indications sent by the terminals are received, so that the base station may know about times when the terminals complete the spectrum sensing tasks more exactly.

Step S211: sensing results sent by the terminals according to the sensing task reporting commands are received. Alternatively, the sensing results include: whether sensed channels are idle or not, transmitted energy on the sensed channels and geographical locations of the terminals during sensing.

Alternatively, the sensing task reporting commands include: time periods when the spectrum sensing tasks are recorded, and conditions for reporting the spectrum sensing tasks by the terminals.

Step S213: whether sensed spectrum resources are available or not is judged according to the sensing results sent by multiple terminals. In the method for detecting the spectrum resource according to the embodiment of the disclosure, the base station is required to receive all the sensing results sent by the multiple terminals and further judge whether the sensed spectrum resources are available or not according to a practical condition, such as a load condition and an occupancy ratio.

Embodiment 3

Figure 3:
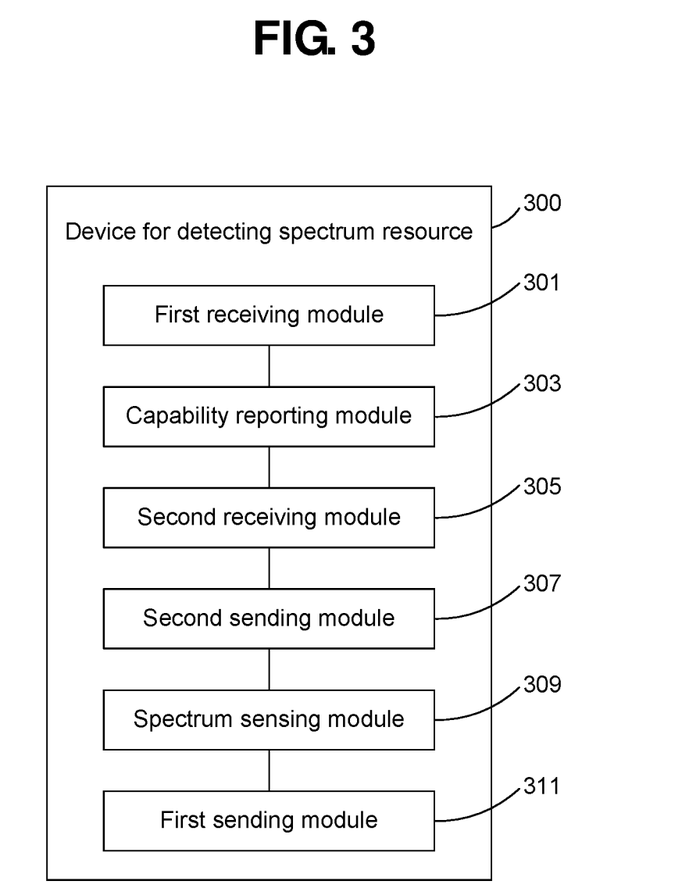
FIG. 3 is a structure diagram of a device for detecting spectrum resource applied to a terminal according to an embodiment of the disclosure.

According to another aspect of the disclosure, a device 300 for detecting spectrum resource is provided, which is applied to a terminal. As shown in FIG. 3, the device includes:

a first receiving module 301, configured to receive a capability reporting instruction sent by a base station;

a capability reporting module 303, configured to send a capability report of the terminal to the base station according to the capability reporting instruction;

a second receiving module 305, configured to receive a spectrum sensing configuration command sent by the base station according to the capability report of the terminal;

a spectrum sensing module 309, configured to perform spectrum sensing to obtain a sensing result according to the spectrum sensing configuration command; and a first sending module 311, configured to send the sensing result to the base station according to a sensing task reporting command transmitted by the base station.

Alternatively, the capability report includes: information about whether the terminal has a capability of communication in a preset frequency band or not, or whether the terminal has a spectrum sensing capability or not.

Alternatively, the spectrum sensing configuration command includes: a time length required by execution of a spectrum sensing task, a frequency point and bandwidth required by execution of the spectrum sensing task, and a period of execution of the spectrum sensing task.

Alternatively, the spectrum sensing configuration command further includes: one or more items among: a time when the sensing task is started, a sensing result required to be recorded when any sensing task is executed, identification of the terminal which performs spectrum sensing and whether location information is required to be reported or not.

Figure 4:
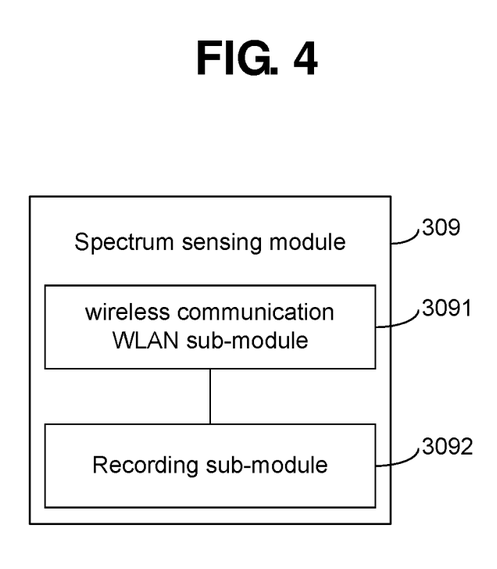
FIG. 4 is a structure diagram of a spectrum detection module.

Alternatively, as shown in FIG. 4, the spectrum sensing module 309 includes:

a WLAN sub-module 3091, configured to enable a CSMA/CA function, and execute a channel sensing function in CSMA/CA according to the spectrum sensing configuration command; and a recording sub-module 3092, configured to, after the WLAN sub-module 3091 completes the channel sensing function, obtain a sensing result.

Alternatively, the sensing result includes: whether a sensed channel is idle or not, transmitted energy on the sensed channel, and a geographical location during sensing.

Alternatively, the device further includes: a second sending module 307, configured to, after spectrum sensing is completed, when in a connected state, directly send a sensing completion indication to the base station, and receive the sensing task reporting command transmitted by the base station; and when in an idle state, send the sensing completion indication to the base station when entering the connected state next time, or directly initiate random access, and after entering the connected state, send the sensing completion instruction to the base station, and receive the sensing task reporting command transmitted by the base station.

Alternatively, the sensing task reporting command includes: a time period when the spectrum sensing task is recorded, and a condition for reporting the spectrum sensing task by the terminal.

Embodiment 4

Figure 5:
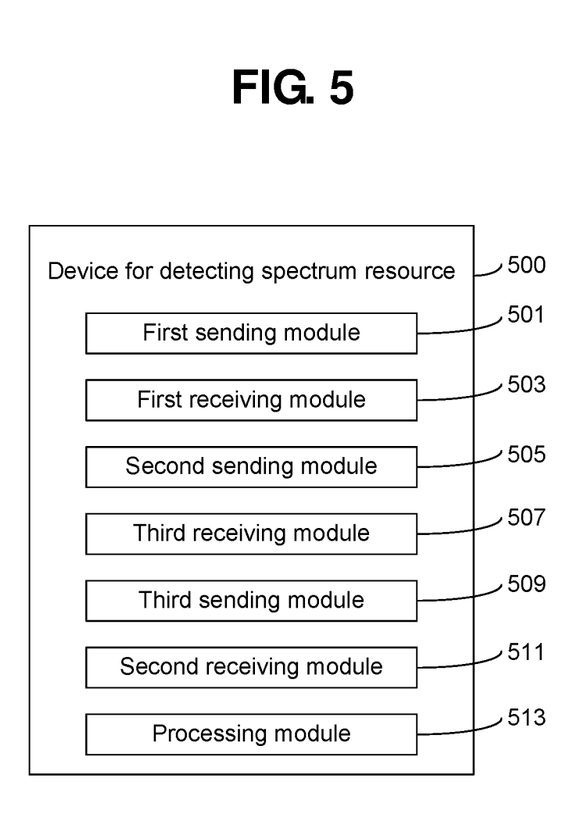
FIG. 5 is a structure diagram of a device for detecting spectrum resource applied to a base station according to an embodiment of the disclosure.

According to another aspect of the disclosure, a device 500 for detecting spectrum resource is provided, which is applied to a base station. As shown in FIG. 5, the device includes:

a first sending module 501, configured to send capability reporting instructions to terminals;

a first receiving module 503, configured to receive capability reports sent by the terminals according to the capability reporting instructions; a second sending module 505, configured to send spectrum sensing configuration commands to terminals with a spectrum sensing capability ahead of preset time according to the capability reports;

a third sending module 509, configured to send sensing task reporting commands to the terminals with the spectrum sensing capability;

a second receiving module 511, configured to receive sensing results sent by the terminals with the spectrum sensing capability according to the sensing task reporting commands; and a processing module 513, configured to judge whether sensed spectrum resources are available or not according to the sensing results sent by multiple terminals with the spectrum sensing capability.

Alternatively, the capability reports include: information about whether the terminals have a capability of communication in preset frequency bands or not, or whether the terminals have the spectrum sensing capability or not.

Alternatively, when the terminals are in a connected state, the second sending module 505 is further configured to:

send the spectrum sensing configuration commands to the terminals ahead of the preset time through RRC signalling.

Correspondingly, the spectrum sensing configuration commands include: time lengths required by execution of spectrum sensing tasks by the terminals, frequency points and bandwidths required by execution of the spectrum sensing tasks by the terminals, and periods of execution of the spectrum sensing tasks by the terminals.

When the terminals are in an idle state, the second sending module 505 is further configured to:

send the spectrum sensing configuration commands to the terminals ahead of the preset time in a paging manner.

Correspondingly, the spectrum sensing configuration commands include: identification of the terminals which perform spectrum sensing, the time lengths required by execution of the spectrum sensing tasks by the terminals, the frequency points and bandwidths required by execution of the spectrum sensing tasks by the terminals, and the periods of execution of the spectrum sensing tasks by the terminals.

Alternatively, no matter whether the terminals are in the connected state or the idle state, the spectrum sensing configuration commands may include other items according to a requirement, for example: one or more items among: times when the terminals start performing the sensing tasks, sensing results required to be recorded when any sensing task is executed by the terminals and whether the terminals are required to report location information or not.

Alternatively, the sensing results include: whether sensed channels are idle or not, transmitted energy on the sensed channels and geographical locations of the terminals during sensing.

Alternatively, the device further includes: a third receiving module 507, configured to, after the terminals complete the spectrum sensing tasks, receive sensing completion indications sent by the terminals.

Alternatively, the sensing task reporting commands include: time periods when the spectrum sensing tasks are recorded, and conditions for reporting the spectrum sensing tasks by the terminals.

Embodiment 5

According to another aspect of the disclosure, a terminal is further provided, which includes the device applied to the terminal for detecting the spectrum resource.

Embodiment 6

According to another aspect of the disclosure, a terminal is further provided, which includes the device applied to the base station for detecting the spectrum resource.

Those skilled in the art should know that the embodiment of the disclosure may be provided as a method, a device (equipment) or a computer program product. Therefore, the disclosure may adopt a form of pure hardware embodiment, pure software embodiment or combined software and hardware embodiment. Moreover, the disclosure may adopt a form of computer program product implemented on one or more computer-available storage media (including, but not limited to, a disk memory, a read-only optical disk and an optical memory) including computer-available program codes.

The disclosure is described with reference to flowcharts and/or block diagrams of the method, device (equipment) and computer program product according to the embodiment of the disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing equipment to generate a machine, so that a device for realizing a function specified in one flow or more flows in the flowcharts and/or one block or more blocks in the block diagrams is generated by the instructions executed through the computer or the processor of the other programmable data processing equipment.

These computer program instructions may also be stored in a computer-readable memory capable of guiding the computer or the other programmable data processing equipment to work in a specific manner, so that a product including an instruction device may be generated by the instructions stored in the computer-readable memory, the instruction device realizing the function specified in one flow or many flows in the flowcharts and/or one block or many blocks in the block diagrams.

These computer program instructions may further be loaded onto the computer or the other programmable data processing equipment, so that a series of operating steps are executed on the computer or the other programmable data processing equipment to generate processing implemented by the computer, and steps for realizing the function specified in one flow or many flows in the flowcharts and/or one block or many blocks in the block diagrams are provided by the instructions executed on the computer or the other programmable data processing equipment.

The above is only the preferred implementation mode of the disclosure. It should be pointed out that those skilled in the art may further make various improvements and embellishments without departing from the principle of the disclosure, and these improvements and embellishments also fall within the scope of protection of the disclosure.

The invention claimed is:

1. A method for detecting spectrum resource, comprising:
   receiving a capability reporting instruction sent by a base station;
   sending a capability report of a terminal to the base station according to the capability reporting instruction;
   receiving a spectrum sensing configuration command sent by the base station according to the capability report of the terminal;
   performing spectrum sensing to obtain a sensing result according to the spectrum sensing configuration command; and
   sending the sensing result to the base station according to a sensing task reporting command transmitted by the base station.

2. The method according to claim 1, wherein the capability report comprises: information about whether the terminal has a capability of communication in a preset frequency band or not, or whether the terminal has a spectrum sensing capability or not.

3. The method according to claim 1, wherein the spectrum sensing configuration command comprises: a time length required by execution of a spectrum sensing task, a frequency point and bandwidth required by execution of the spectrum sensing task, and a period of execution of the spectrum sensing task.

4. The method according to claim 3, wherein the spectrum sensing configuration command further comprises: one or more items among the followings: a time when the sensing task is started, a sensing result required to be recorded when any sensing task is executed, identification of the terminal which performs spectrum sensing, and whether location information is required to be reported or not.

5. The method according to claim 1, wherein the step of performing spectrum sensing to obtain the sensing result according to the spectrum sensing configuration command comprises:
   starting a wireless communication module of the terminal, and enabling a Carrier Sense Multiple Access with Collision Avoidance (CSMA/CA) function;
   executing a channel sensing function in CSMA/CA according to the spectrum sensing configuration command; and
   after the channel sensing function is completed, obtaining a sensing result.

6. The method according to claim 1, wherein the sensing result comprises: whether a sensed channel is idle or not, transmitted energy on the sensed channel, and a geographical location during sensing.

7. The method according to claim 1, before the step of sending the sensing result to the base station according to the sensing task reporting command transmitted by the base station, further comprising:
  after spectrum sensing is completed, when in a connected state, directly sending a sensing completion indication to the base station, and receiving the sensing task reporting command transmitted by the base station.

8. A method for detecting spectrum resource, comprising:
  sending capability reporting instructions to terminals;
  receiving capability reports sent by the terminals according to the capability reporting instructions;
  sending spectrum sensing configuration commands to terminals with a spectrum sensing capability ahead of a preset time according to the capability reports;
  sending sensing task reporting commands to the terminals with the spectrum sensing capability;
  receiving sensing results sent by the terminals with the spectrum sensing capability according to the sensing task reporting commands; and
  judging whether the sensed spectrum resource is available or not according to the sensing results sent by multiple terminals with the spectrum sensing capability.

9. The method according to claim 8, wherein the capability reports comprise: information about whether the terminals have a capability of communication in preset frequency bands or not, or whether the terminals have the spectrum sensing capability or not.

10. The method according to claim 8, wherein, when the terminals are in a connected state, the step of sending the spectrum sensing configuration commands to the terminals with the spectrum sensing capability ahead of the preset time according to the capability reports comprises:
  sending the spectrum sensing configuration commands to the terminals ahead of the preset time through Radio Resource Control (RRC) signalling according to the capability reports.

11. The method according to claim 10, wherein the spectrum sensing configuration commands comprise: time lengths required by execution of spectrum sensing tasks by the terminals, frequency points and bandwidths required by execution of the spectrum sensing tasks by the terminals, and periods of execution of the spectrum sensing tasks by the terminals.

12. The method according to claim 11, wherein the spectrum sensing configuration commands further comprise: one or more items among the followings: times when the terminals start performing the sensing tasks, sensing results required to be recorded when any sensing task is executed by the terminals, and whether the terminals are required to report location information or not.

13. The method according to claim 8, wherein, when the terminals are in an idle state, the step of sending the spectrum sensing configuration commands to the terminals with the spectrum sensing capability ahead of the preset time according to the capability reports comprises:
  sending the spectrum sensing configuration commands to the terminals ahead of the preset time in a paging manner according to the capability reports.

14. The method according to claim 13, wherein the spectrum sensing configuration commands comprise: identification of the terminals which perform spectrum sensing, the time lengths required by execution of the spectrum sensing tasks by the terminals, the frequency points and bandwidths required by execution of the spectrum sensing tasks by the terminals, and the periods of execution of the spectrum sensing tasks by the terminals.

15. The method according to claim 14, wherein the spectrum sensing configuration commands further comprise: one or more items among the followings: the times when the terminals start performing the sensing tasks, the sensing results required to be recorded when any sensing task is executed by the terminals, and whether the terminals are required to report the location information or not.

16. The method according to claim 8, wherein the sensing results comprise: whether sensed channels are idle or not, transmitted energy on the sensed channels and geographical locations of the terminals during sensing.

17. A device for detecting spectrum resource, applied to a terminal, the device comprising:
  a processor; and
  a memory for storing instructions executable by the processor,
  wherein execution of instructions by the processor causes the processor to perform:
  receiving a capability reporting instruction sent by a base station;
  sending a capability report of the terminal to the base station according to the capability reporting instruction;
  receiving a spectrum sensing configuration command sent by the base station according to the capability report of the terminal;
  preforming spectrum sensing to obtain a sensing result according to the spectrum sensing configuration command; and
  sending the sensing result to the base station according to a sensing task reporting command transmitted by the base station.

18. A device for detecting spectrum resource, applied to a base station, the device comprising:
  a processor; and
  a memory for storing instructions executable by the processor,
  wherein execution of the instructions by the processor causes the processor to perform:
  sending capability reporting instructions to terminals:
  receiving capability reports sent by the terminals according to the capability reporting instructions;
  sending spectrum sensing configuration commands to terminals with a spectrum sensing capability ahead of a preset time according to capability reports;
  sending sensing task reporting commands to the terminals with the spectrum sensing capability;
  receiving sensing results sent by the terminals with the spectrum sensing capability according to the sensing task reporting commands; and
  judging whether sensed spectrum resource is available or not according to the sensing results sent by multiple terminals with the spectrum sensing capability.

19. A terminal, comprising the device for detecting the spectrum resource according to claim 17.

20. A base station, comprising the device for detecting the spectrum resource according to claim 18.

* * * * *